United States Patent [19]
Land et al.

[11] Patent Number: 5,633,332
[45] Date of Patent: May 27, 1997

[54] POLYMERS BASED ON POLYARYLENE SILOXANES AND FREERADICAL-POLYMERIZABLE MONOMERS

[75] Inventors: Horst-Tore Land, Frankfurt am Main; Walter Schubert, Wuppertal; Reinhardt Kalus, St. Katharinen, all of Germany

[73] Assignee: Hoechst Aktiengesellschaft, Frankfurt, Germany

[21] Appl. No.: 428,066

[22] PCT Filed: Oct. 15, 1993

[86] PCT No.: PCT/EP93/02854

§ 371 Date: Apr. 26, 1995

§ 102(e) Date: Apr. 26, 1995

[87] PCT Pub. No.: WO94/10218

PCT Pub. Date: May 11, 1994

[30] Foreign Application Priority Data

Oct. 28, 1992 [DE] Germany .......... 42 36 303.9
Mar. 27, 1993 [DE] Germany .......... 43 10 089.9

[51] Int. Cl.⁶ .................................................. C08F 283/12
[52] U.S. Cl. .................. 525/479; 528/25; 528/26; 524/113; 524/315; 524/351; 524/378; 524/588
[58] Field of Search ................ 525/479; 578/26, 578/25; 524/588

[56] References Cited

U.S. PATENT DOCUMENTS

| | | | |
|---|---|---|---|
| 3,536,657 | 10/1970 | Noshay | 525/479 |
| 3,565,851 | 2/1971 | Neuroth | 525/479 |
| 3,631,087 | 12/1971 | Lewis | 525/479 |
| 3,694,478 | 9/1972 | Adams | 525/479 |
| 3,897,390 | 7/1975 | Groult | 528/29 |
| 4,123,472 | 10/1978 | Getson | 525/479 |
| 4,871,816 | 10/1989 | Percec et al. | 525/393 |

FOREIGN PATENT DOCUMENTS

| | | |
|---|---|---|
| 0 398 049 A2 | 11/1990 | European Pat. Off. . |
| 26 07 151 A1 | 8/1977 | Germany . |
| 26 10 372 A1 | 9/1977 | Germany . |

*Primary Examiner*—Ralph H. Dean
*Attorney, Agent, or Firm*—Curtis, Morris & Safford P.C.

[57] ABSTRACT

Polymers can be obtained by free-radical polymerization of monomers in the presence of a dissolved polysiloxane. The free-radical-polymerizable monomers used are at least one compound of the formula I

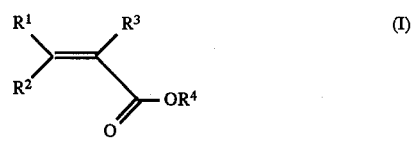

where
R$^1$ and R$^2$ are, independently of one another, hydrogen, COOH, C$_1$-C$_{18}$-alkyl, cyclohexyl, C$_1$-C$_4$-alkyl-cyclohexyl, C$_6$-C$_{10}$-bicycloalkyl, C$_6$-C$_{18}$-tricycloalkyl,
R$^3$ is hydrogen or methyl,
R$^4$ is hydrogen, (C$_1$-C$_{20}$)-alkyl, 2-hydroxypropyl, glycidyl,
—[CH$_2$CH$_2$—O]$_n$H, having n=1 to 5,
—[CH$_2$]$_m$—OH, having m=3 to 18, in particular m=3 to 8,
—[CH$_2$]$_2$O—[CO—(CH$_2$)$_5$]$_x$OH, where x=a number from 1 to 3, or
—[CH$_2$CHOHCH$_2$]—O—(CO)R,
where R is a C$_1$ to C$_{18}$-alkyl radical.

The polysiloxane used is at least one aromatic polyarylene siloxane of the formula III

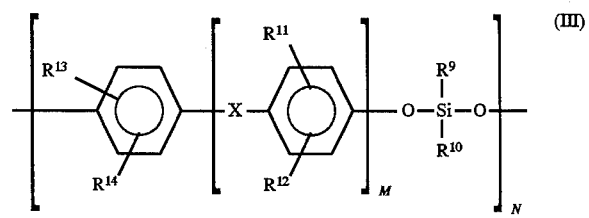

where
R$^9$ and R$^{10}$ are, independently of one another, a C$_1$-C$_{12}$-alkyl radical, a C$_6$-C$_{14}$-aryl radical, or an unsubstituted or substituted vinyl radical, and
R$^{11}$, R$^{12}$, R$^{13}$ and R$^{14}$ are, independently of one another, hydrogen, a C$_1$-C$_3$-alkyl radical or a substituted or unsubstituted C$_6$-C$_{14}$-aryl radical and
—X— is a group —C(CH$_3$)$_2$—, —C(CF$_3$)$_2$—, —S—, —SO$_2$—, —CH$_2$— or a cyclohexylidene group, or a single chemical bond and M is equal to 0 or 1 and N is a number from 2 to 500, in particular from 3 to 200.

15 Claims, No Drawings

POLYMERS BASED ON POLYARYLENE SILOXANES AND FREERADICAL-POLYMERIZABLE MONOMERS

DESCRIPTION

The present invention relates to polymers based on polyarylene siloxanes and on free-radical-polymerizable monomers, a process for their preparation and their use.

Polymers which are prepared with the aid of free-radical-forming initiators by polymerization of organic monomers containing a C—C double bond have, owing to their properties matched to the respective application, found extremely wide use.

Polysiloxane compounds are also technologically important, with the aliphatic poly(dimethylsiloxanes) representing the most important class of materials (J. J. Lebrun, H. Porte in: "Comprehensive Polymer Science", Volume 5, Chapter 35: "Polysiloxanes", pp. 593–609, Pergamon Press New York, 1989).

Increasing importance is being attached to aromatic polysiloxanes, the so called polyarylene siloxanes. These can be used, for example, for release layers in photocopiers (EP-A-030 817), as photoresist materials, as flame-resistant thermoplastics (EP-A-398 049), as plasticizers for polycarbonates (DE-A-28 32 342) and as constituents of powder surface coating systems (DE-A-41 29 000).

Polymers which are prepared both from free-radical-polymerizable monomers and also from aliphatic siloxane compounds can be used for impregnating and coating textiles (DE-C3-26 10 372; U.S. Pat. No. 4,153,640).

It is an object of the invention to provide new polymers based on aromatic polysiloxanes.

This object is achieved according to the invention by providing polymers which can be obtained by free-radical polymerization of free-radical-polymerizable monomers in the presence of polysiloxanes dissolved in a solvent, where the free-radical-polymerizable monomers used are at least one of the formula I,

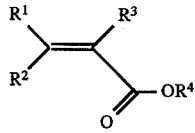

where $R^1$ and $R^2$ are, independently of one another, hydrogen, COOH, $C_1$–$C_{18}$-alkyl, cyclohexyl, $C_1$–$C_4$-alkyl-cyclohexyl, $C_6$–$C_{10}$-bicycloalkyl, $C_6$–$C_{18}$-tricycloalkyl, $R^3$ is hydrogen or methyl, $R^4$ is hydrogen, $(C_1$–$C_{20})$-alkyl, 2-hydroxypropyl, glycidyl, —[$CH_2CH_2$—O]$_n$H, having n=1 to 5, —[$CH_2$]$_m$—OH, having m=3 to 18, in particular m=3 to 8, —[$CH_2$]$_2$O—[CO—($CH_2$)$_5$]$_x$OH, where x=a number from 1 to 3, or

—[$CH_2$CHOHCH$_2$]—O—(CO)R, where R is a $C_1$ to $C_{18}$-alkyl radical and, if desired, a free-radical-polymerizable monomer of the formula II

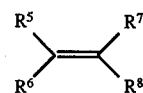

where $R^5$ is selected from among alkenyl (2 to 4 carbon atoms), aryl, CHO and $CH_3(CH_2)_zCO_2$—, $R^6$, $R^7$ and $R^8$ are, independently of one another, H, $C_1$–$C_5$-alkyl, —COOH, —$CO_2$-alkyl (having from 1 to 4 carbon atoms) and CHO, where the sum of the groups —COOH and $CO_2$-alkyl is at most two and $R^5$ and $R^7$ can together be a carboxylic acid anhydride group CO—O—CO and z is a number from 0 to 5, and the polysiloxanes used are at least one aromatic polyarylene siloxane of the formula III,

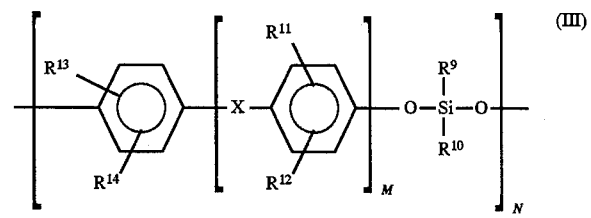

where $R^9$ and $R^{10}$ are identical or different and are, independently of one another, a $C_1$–$C_{12}$-alkyl radical, a $C_6$–$C_{14}$-aryl radical, or an unsubstituted or substituted vinyl radical, and $R^{11}$, $R^{12}$, $R^{13}$ and $R^{14}$ are identical or different and are, independently of one another, hydrogen, a $C_1$–$C_3$-alkyl radical or a substituted or unsubstituted $C_6$–$C_{14}$-aryl radical and —X— is a group —$C(CH_3)_2$—, —$C(CF_3)_2$—, —S—, —$SO_2$—, —$CH_2$— or a cyclohexylidene group which can be unsubstituted or substituted, preferably alkyl-substituted, or is a single chemical bond and where M is equal to 0 or 1 and N is a number from 2 to 500, in particular from 3 to 200.

The alkyl radicals $R^9$ and $R^{10}$ can be straight-chain or branched. Preference is given to a $C_1$–$C_3$-alkyl radical.

The aryl radicals $R^9$ and $R^{10}$ can be substituted by $C_1$–$C_6$-alkyl radicals, halogen atoms (F, Cl, Br) and also by vinyl groups. Preference is given to a phenyl radical.

The vinyl radicals $R^9$ and $R^{10}$ can be substituted by $C_6$–$C_{12}$-aryl radicals, halogen atoms (F, Cl, Br) and by $C_1$–$C_6$-alkyl radicals.

The aryl radicals $R^{11}$ to $R^{14}$ can be substituted by $C_1$–$C_6$-alkyl groups, halogen atoms (F, Cl, Br) and by vinyl groups.

The cyclohexylidene group X can be substituted by up to six $C_1$–$C_6$-alkyl groups, $C_6$–$C_{12}$-aryl groups and/or by halogen atoms (F, Cl, Br).

Suitable alkyl radicals for $R^1$ and/or $R^2$ are, in particular, ethylhexyl, octyl, 3,5,5-trimethylhexyl, decyl, dodecyl, hexyldecyl, octadecyl, lauryl, methyl, ethyl, propyl, butyl, isobutyl, tertiary butyl, pentyl and hexyl.

As alkylcyclohexyl radicals $R^1$ and/or $R^2$, preference is given to the 4-t-butylcyclohexyl radical. Suitable bicycloalkyl and tricycloalkyl radicals $R^1$ and/or $R^2$ are mainly radicals containing 6-membered rings, e.g. the isobornyl radical.

The aryl group $R^5$ is preferably a phenyl group. It can be substituted by carboxyl, amino, hydroxy, $C_1$–$C_4$-alkoxy, $C_1$–$C_4$-alkyl and isocyanate.

For $R^6$ to $R^8$, suitable alkyl radicals are, in particular, methyl and ethyl, suitable —$CO_2$-alkyl radicals are, in particular, the methyl carboxylate and ethyl carboxylate groups.

Monomers of the formula I are, for example, unsaturated carboxylic acids such as, for example, acrylic acid, methacrylic acid, maleic acid, crotonic acid and their ester compounds. Preference is given to esters based on acrylic acid and methacrylic acid.

Examples of monomers of the formula I having secondary OH functions are 2-hydroxypropyl (meth)acrylate and adducts of glycidyl (meth)acrylate with saturated short-chain fatty acids containing $C_1$–$C_3$-alkyl radicals, eg. acetic acid or propionic acid, and also adducts of a glycidyl ester of a tertiary carboxylic acid with unsaturated COOH-functional compounds such as, for example, acrylic or methacrylic acid, maleic acid, crotonic acid. Further examples of monomers of the formula I are adducts of a glycidyl ester of a tertiary carboxylic acid with unsatu- rated anhydrides such as, for example, maleic anhydride, and also adducts of glycidyl (meth)acrylate with fatty acids containing $C_4$–$C_{20}$-alkyl radicals, for example butanoic acid, caproic acid, lauric acid, palmitic acid, stearic acid or arachidonic acid. The glycidyl esters of the tertiary carboxylic acids are derived, for example, from pivalic acid, from ®Versatic acids (Deutsche Shell) or ®Neo acids (Exxon). The commercial product ®Cardura E is the glycidyl ester of a tertiary carboxylic acid (Versatic acid). Adducts of glycidyl (meth)acrylate with fatty acids containing $C_4$–$C_{20}$-alkyl radicals can be further processed to give surface coatings which have particularly high gloss.

Versatic acids and Neo acids are tertiary carboxylic acids of the formula R', R", R'" C—COOH, where R', R" and R'" can be, independently of one another, $C_1$–$C_6$-alkyl radicals and $C_6$–$C_{12}$-aryl radicals.

Adducts of glycidyl (meth) acrylate with saturated fatty acids have the composition $CH_2=CA-CO_2-CH_2CHOHCH_2-OCOR$, where A is H or $CH_3$ and R is $C_1$ to $C_{18}$-alkyl.

Examples of monomers of the formula I having primary OH groups are hydroxyalkyl esters of acrylic acid and of methacrylic acid having a primary OH group and a C–$C_3$-alkyl radical, such as hydroxyethyl (meth)acrylate, and also hydroxyalkyl esters of acrylic acid and of methacrylic acid having a primary ON group and a $C_4$–$C_{18}$-alkyl radical, such as butanediol monoacrylate, hydroxyhexyl acrylate, hydroxyoctyl acrylate and the corresponding methacrylates and reaction products of hydroxyethyl (meth)acrylate with caprolactone.

Examples of monomers of the formula I which are free of OH groups are long-chain, branched or unbranched unsaturated monomers such as alkyl (meth)acrylates having $C_8$–$C_{18}$ chains in the alkyl part, eg. ethylhexyl (meth) acrylate, octyl (meth)acrylate, 3,5,5-trimethylhexyl (meth) acrylate, decyl (meth)acrylate, dodecyl (meth)acrylate, hexyldecyl (meth)acrylate, octadecyl (meth)acrylate, lauryl acrylate, isobornyl (meth)acrylate or 4-tert-butylcyclohexyl methacrylate. Further examples are short-chain and intermediate-chain, branched or unbranched unsaturated monomers such as alkyl (meth)acrylates having $C_1$–$C_7$ chains in the alkyl part, e.g. methyl (meth)acrylate, ethyl (meth)acrylate, propyl acrylate, butyl (meth)acrylate, isobutyl (meth)acrylate, tertiary butyl (meth)acrylate, pentyl (meth)acrylate, hexyl (meth)acrylate, cyclohexyl (meth) acrylate.

Examples of monomers of the formula (II) are, in particular, aromatic vinyl compounds such as styrene, p-methylstyrenes and vinyl acetate.

Examples of polysiloxane compounds of the formula III and the preparation thereof are described in the German Patent Application P 42 15 139.2.

The polymers of the invention can be prepared by mixing at least one monomer of the formula I and, if desired, of the formula II and also at least one free-radical initiator in a reservoir and by subsequently metering the mixture into at least one polyarylene siloxane of the formula III in an organic solvent while stirring at elevated temperature, eg. at from 50° to 180° C., in particular at from 100° to 150° C.

The proportion of the monomers of the formula II is from 0 to 50% by weight, in particular from 5 to 30% by weight, based on the total mass of the monomers of the formulae I and II.

The weight ratio of polyarylene siloxane/(monomers of the formulae I and, if present, II) is from 1:99 to 99:1, preferably from 3 to 45, particularly preferably from 8 to 35.

Examples of free-radical initiators are dialkyl peroxides such as di-tert-butyl peroxide, dicumyl peroxide; diacyl peroxides such as dibenzoyl peroxide, dilauryl peroxide; hydroperoxides such as cumene hydroperoxide, tert-butyl hydroperoxide; peresters such as tert-butyl perbenzoate, tert-butyl perpivalate, tert-butyl per-3,5,5-trimethylhexanoate, tert-butyl per-2-ethylhexanoate; peroxydicarbonates such as di-2-ethylhexyl peroxydicarbonate, dicyclohexyl peroxydicarbonate; perketals such as 1,1-bis(tert-butylperoxy)3,5,5-trimethylcyclohexane, 1,1-bis(tert-butylperoxy)cyclohexane; ketone peroxides such as cyclohexanone peroxide, methyl isobutyl ketone peroxide and azo compounds such as 2,2'-azobis(2,4-dimethylvaleronitrile), 2,2'-azobis(2-methylbutyronitrile), 1,1'-azobiscyclohexanecarbonitrile, azobis-isobutyronitrile.

The free-radical initiators are generally added in an amount of from 0.1 to 4% by weight, based on the weight of monomers used.

Suitable organic solvents are aromatics such as xylene, aliphatics and cycloaliphatics, esters such as butyl acetate, ethers such as diethyl ether, t-butyl methyl ether and tetrahydrofuran and ketones such as acetone or t-butyl methyl ketone. The polymers preferably have hydroxyl numbers of 60–250, in particular 80–180, and acid numbers of 5–60, in particular 15–40.

The polymers of the invention can be used for hydrophobicizing industrial fibers and textiles or as components for composite structures. The hydrophobicization can be carried out as described in DE-A 2 010 372, Example 3 (treatment III).

The following examples illustrate the invention.

EXAMPLES

All parts are by weight.

Example 1

A 4 liter three-neck flask fitted with stirrer, dropping funnel and reflux condenser is initially charged with 220 parts of the α,ω-hydroxy-functional polyarylene siloxane of the formula IV

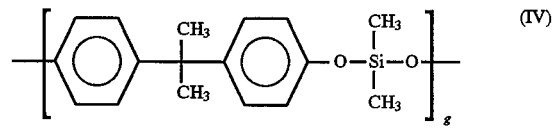

and 170.5 parts of butyl acetate (=BuAc) and the mixture is heated to boiling. Subsequently, a mixture of 5.5 parts of acrylic acid
67 parts of butyl methacrylate
97 parts of ethylhexyl acrylate
144 parts of styrene
176 parts of methyl methacrylate
30 parts of BuAc
620.4 parts of hydroxypropyl methacrylate and
31.9 parts of tert-butyl perbenzoate is continuously metered in over a period of 5 hours. A further 58.7 parts of BuAc and 2.9 parts of tert-butyl perbenzoate are then added and the mixture is stirred under reflux for a further two hours. The mixture is then adjusted to a solids content of 55.5% using 576.1 parts of BuAc.

Example 2

In a 4 liter three-neck flask fitted with stirrer, dropping funnel and reflux condenser, 400 parts of the α,ω-hydroxy-functional polyarylene siloxane of the formula IV and 200 parts of BuAc are heated to 142° C. Subsequently, a mixture of 5 parts of acrylic acid
48.2 parts of butyl methacrylate
88.2 parts of ethylhexyl acrylate
131 parts of styrene
160 parts of methyl methacrylate
40 parts of butyl acetate
564 parts of hydroxypropyl methacrylate and
29 parts of tert-butyl perbenzoate is continuously metered in over a period of 5 hours. A further 53.4 parts of BuAc and 2.6 parts of tert-butyl perbenzoate are then added and the mixture is stirred under reflux for a further two hours. The mixture is then adjusted to a solids content of 54.5% using 278.6 parts of butyl acrylate.

Example 3

A 4 liter three-neck flask fitted with stirrer, dropping funnel and reflux condenser is initially charged with 62 parts of the α,ω-hydroxy-functional polyarylene siloxane of the formula IV and 330 parts of butyl acetate and the mixture is heated to boiling. Subsequently, a mixture of 5.4 parts of acrylic acid
77 parts of butyl methacrylate
89 parts of ethylhexyl acrylate
155 parts of styrene
186 parts of methyl methacrylate
25 parts of butyl acetate
610 parts of hydroxypropyl methacrylate and
30.7 parts of tert-butyl perbenzoate is continuously metered in over a period of 5 hours. A further 72 parts of BuAc and 2.8 parts of tert-butyl perbenzoate are then added and the mixture is stirred under reflux for a further two hours. The mixture is then 5 adjusted to a solids content of 55.1% using 615 parts of BuAc.

Example 4

A 4 liter three-neck flask fitted with stirrer, dropping funnel and reflux condenser is initially charged with 712 parts of the α,ω-hydroxy-functional polyarylene siloxane of the formula IV and 450 parts of butyl acetate and the mixture is heated to 142° C. Subsequently, a mixture of 5.4 parts of acrylic acid
80 parts of butyl methacrylate
85 parts of ethylhexyl acrylate
150 parts of styrene
51 parts of methyl methacrylate
45 parts of butyl acetate
615 parts of hydroxypropyl methacrylate and
37.6 parts of tert-butyl perbenzoate is continuously metered in over a period of 5 hours. A further 85 parts of BuAc and 3.0 parts of tert-butyl perbenzoate are then added and the mixture is stirred under reflux for a further two hours. The mixture is then adjusted to a solids content of 54.3% using 921 parts of BuAc.

Table 1 shows some property data for the polymers of the invention as described in Examples 1 to 4.

TABLE 1

Property data for the polymers of the invention as described in Examples 1 to 4

| Example | Acid number based on solid resin [mg KOH/g] | Viscosity [mPa · s] | Solid resin content [%] |
|---|---|---|---|
| 1 | 17.1 | 615 | 55.1 |
| 2 | 16.5 | 390 | 54.5 |
| 3 | 16.4 | 980 | 55.1 |
| 4 | 18.3 | 1420 | 54.3 |

We claim:

1. A polymer obtained by free-radical polymerization of free-radical-polymerizable monomers in the presence of a polysiloxane dissolved in a solvent, where the free-radical-polymerizable monomers used are at least one compound of the formula I,

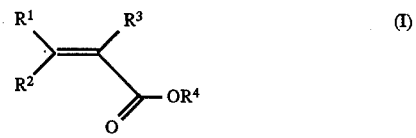

where $R^1$ and $R^2$ are, independently of one another, hydrogen, COOH, $C_1$–$C_{18}$-alkyl, cyclohexyl, $C_1$–$C_4$-alkylcyclohexyl, $C_6$–$C_{10}$-bicycloalkyl, or $C_6$–$C_{18}$-tricycloalkyl, $R^3$ is hydrogen or methyl, $R^4$ is hydrogen, $(C_1$–$C_{20})$-alkyl, 2-hydroxypropyl, glycidyl, —[CH$_2$CH$_2$—O]$_n$H, having n=1 to 5, —[CH$_2$]$_m$—OH, having m=3 to 18, —[CH$_2$]$_2$O—[CO—(CH$_2$)$_5$]$_x$OH, where x=a number from 1 to 3, or

—[CH$_2$CHOHCH$_2$]—O—(CO)R, where R is a $C_1$ to $C_{18}$-alkyl radical and the polysiloxane used is at least one aromatic polyarylene siloxane of the formula III,

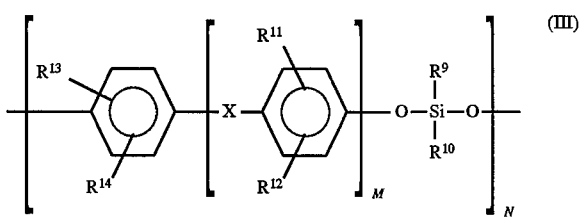

(III)

where

R$^9$ and R$^{10}$ are identical or different and are, independently of one another, a C$_1$–C$_{12}$-alkyl radical, a C$_6$–C$_{14}$-aryl radical, or an unsubstituted or substituted vinyl radical, and R$^{11}$, R$^{12}$, R$^{13}$ and R$^{14}$ are identical or different and are, independently of one another, hydrogen, a C$_1$–C$_3$-alkyl radical or a substituted or unsubstituted C$_6$–C$_{14}$-aryl radical and —X— is a group —C(CH$_3$)$_2$—, —C(CF$_3$)$_2$—, —S—, —SO$_2$—, —CH$_2$— or a cyclohexylidene group which can be unsubstituted or substituted, or is a chemical bond and M is equal to 0 or 1 and N is a number from 2 to 500.

2. A polymer as claimed in claim 1, made with a further free-radical-polymerizable monomer of the formula II

(II)

where

R$^5$ is selected from among alkenyl with 2 to 4 carbon atoms, aryl, CHO or CH$_3$(CH$_2$)$_z$CO$_2$—, R$^6$, R$^7$ and R$^8$ are, independently of one another, H, C$_1$–C$_5$-alkyl, —COOH, —CO$_2$-alkyl with the alkyl having from 1 to 4 carbon atoms or CHO, where the sum of the groups —COOH and CO$_2$-alkyl is at most two and R$^5$ and R$^7$ can together be a carboxylic acid anhydride group CO—O—CO and z is a number from 0 to 5.

3. A polymer as claimed in claim 2, where the free-radical-polymerizable monomer of the formula II is one where R$^5$ is aryl.

4. A polymer as claimed in claim 1, with at least one polyarylene siloxane of the formula III, where R$^9$ and R$^{10}$ are methyl, R$^{11}$, R$^{12}$, R$^{13}$ and R$^{14}$ are hydrogen and X is a —C(CH$_3$)$_2$— group.

5. A polymer as claimed in claim 1, wherein R$^4$ is —[CH$_2$]$_m$—OH, having m=3 to 8.

6. A polymer as claimed in claim 1, wherein X is an alkyl-substituted cyclohexylidene group.

7. A polymer as claimed in claim 1, wherein N is a number from 3 to 200.

8. A process for preparing a polymer as claimed in claim 2, which comprises mixing at least one monomer of the formula I and, if desired, of the formula II and also at least one free-radical initiator in a reservoir, and subsequently metering the mixture into at least one polyarylene siloxane of the formula III in an organic solvent while stirring at elevated temperature, at from 50° to 180° C.

9. The process as claimed in claim 8, wherein from 0 to 50% by weight of monomers of the formula II, based on the total mass of the monomers I and II, are used.

10. The process as claimed in claim 8, wherein a weight ratio of polyarylene siloxane/(monomers of the formulae I and II) of from 1:99 to 99:1 is used.

11. The process as claimed in claim 8, wherein the temperature is from 120° to 150° C.

12. The process as claimed in claim 8, wherein from 5 to 30% by weight of monomers of the formula II, based on the total mass of the monomers I and II, are used.

13. The process as claimed in claim 8, wherein a weight ratio of polyarylene siloxane/(monomers of the formulae I and II) of from 3 to 45 is used.

14. The process as claimed in claim 8, wherein a weight ratio of polyarylene siloxane/(monomers of the formulae I and II) of from 8 to 35 is used.

15. A solution of a polymer as claimed in claim 1 in an organic solvent selected from the group consisting of alkylbenzenes, cycloaliphatics, alkyl alkane-carboxylates, dialkyl ethers, dialkyl ketones and tetrahydrofuran.

* * * * *